Jan. 13, 1970 E. F. DILL, JR 3,489,385
GENERAL UTILITY BASKET
Filed Feb. 2, 1968 3 Sheets-Sheet 1
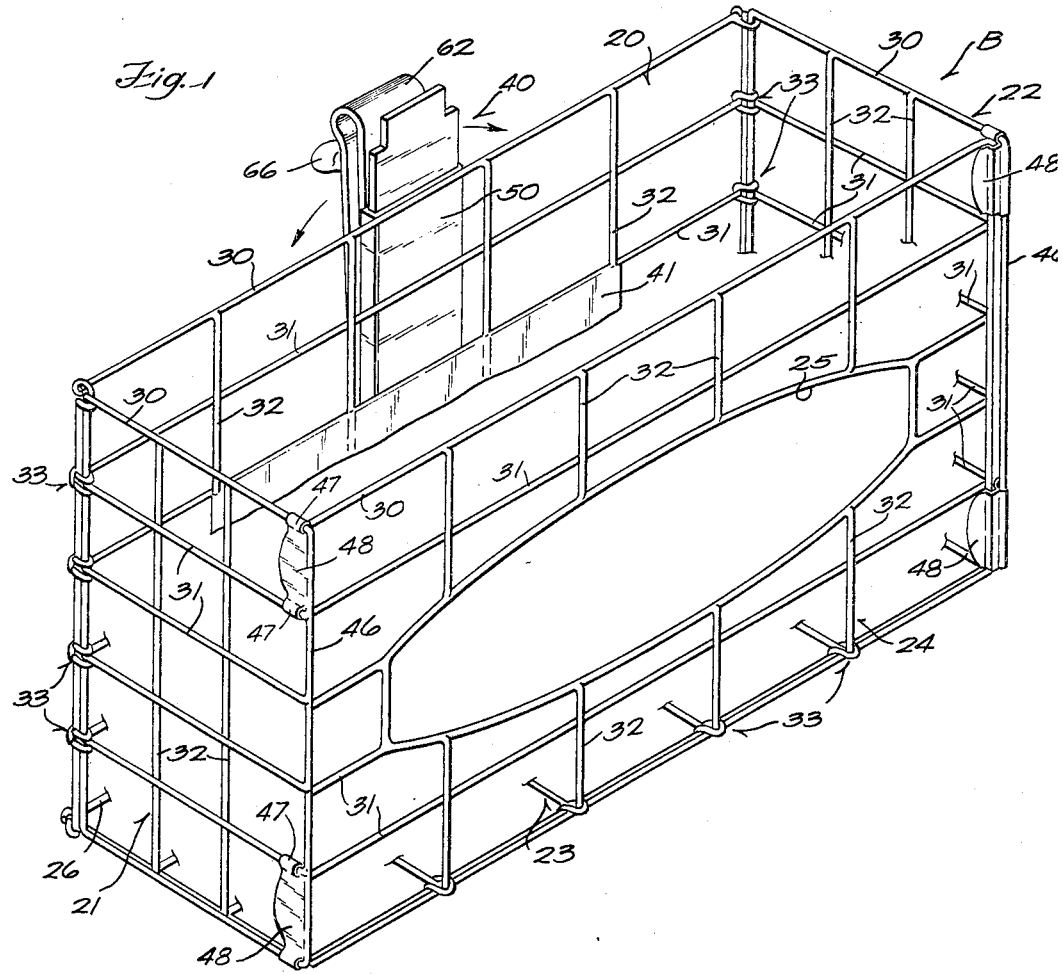
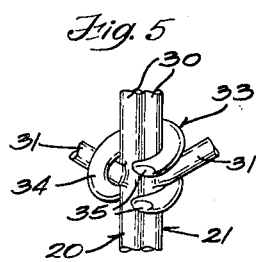
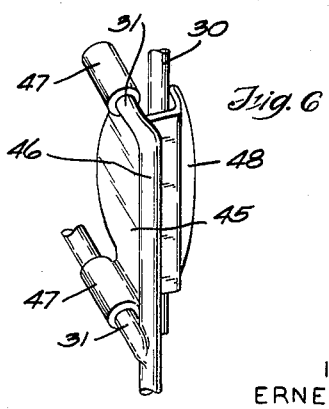
INVENTOR
ERNEST F. DILL, JR.
BY
GEORGE W. WRIGHT, JR.

Jan. 13, 1970 E. F. DILL, JR 3,489,385
GENERAL UTILITY BASKET
Filed Feb. 2, 1968 3 Sheets-Sheet 2
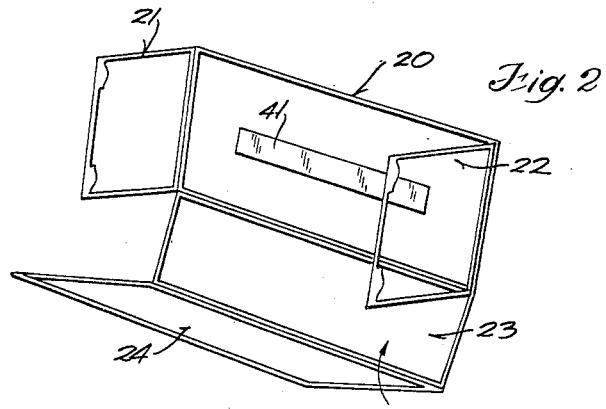
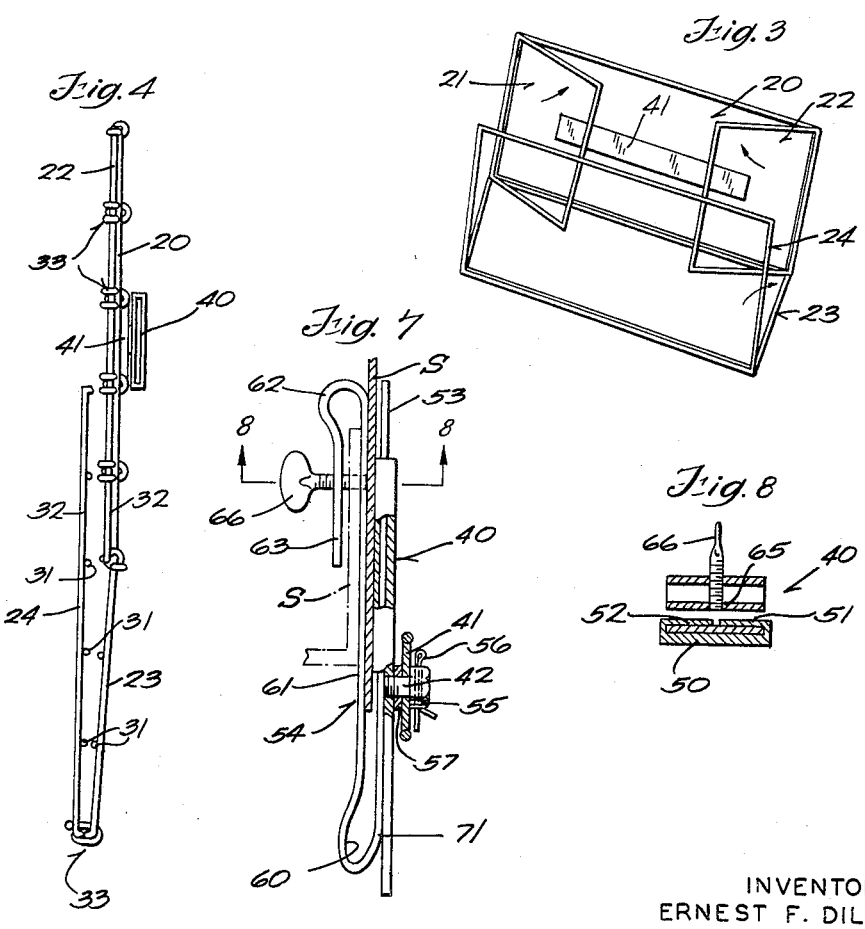
INVENTOR
ERNEST F. DILL, JR.
BY
GEORGE W. WRIGHT, JR.

Jan. 13, 1970    E. F. DILL, JR    3,489,385
GENERAL UTILITY BASKET
Filed Feb. 2, 1968    3 Sheets-Sheet 3
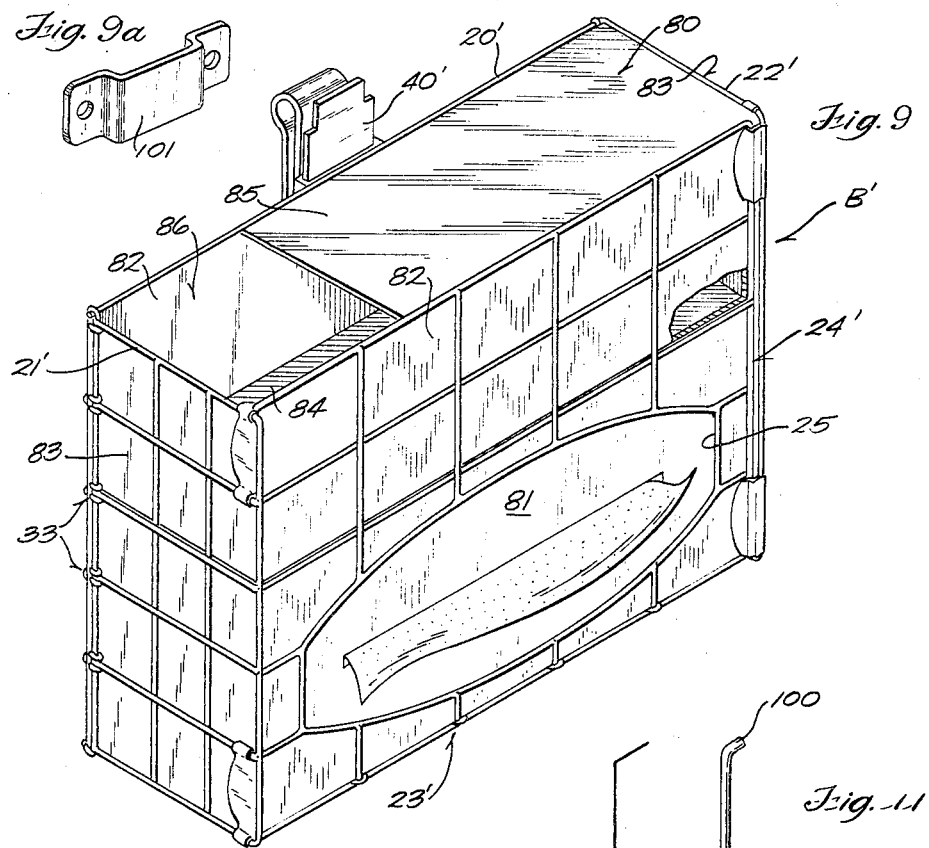
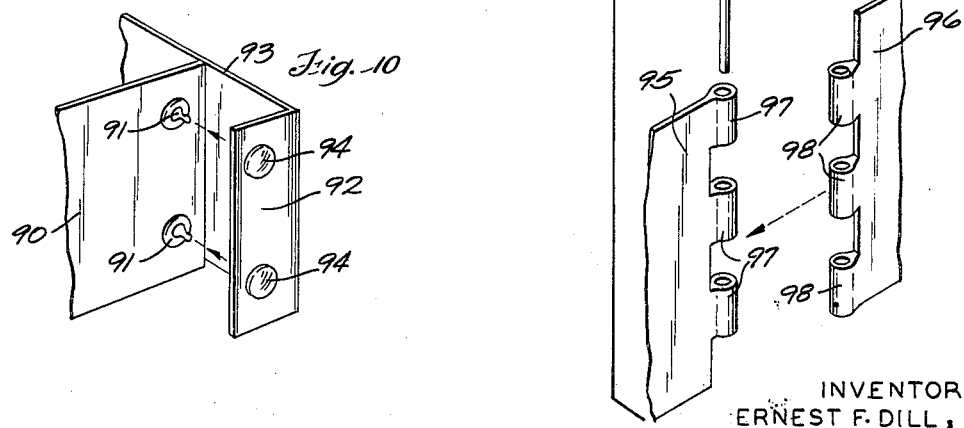
INVENTOR
ERNEST F. DILL, JR.
BY
GEORGE W. WRIGHT, JR.

United States Patent Office 3,489,385
Patented Jan. 13, 1970

3,489,385
GENERAL UTILITY BASKET
Ernest F. Dill, Jr., 866 N. 14th St.,
Milwaukee, Wis. 53233
Filed Feb. 2, 1968, Ser. No. 702,693
Int. Cl. A47k 1/08; A47f 5/08, 5/14
U.S. Cl. 248—311   2 Claims

ABSTRACT OF THE DISCLOSURE

A general utility basket particularly useful for dispensing tissue, commercial wiping towels, automobile litter containers and the like. The basket having a folded collapsible position for convenience in shipping and storage and an operable open position for attachment to various surfaces. For this purpose the basket includes a back wall having hingedly connected thereto end walls and a bottom wall, the bottom wall hingedly carrying the front wall and clips secured to the outer peripheral edges of the end walls to engage the vertical peripheral edge of the front wall. The back wall carrying a bracket and clamping means designed to accommodate the basket in different positions relative to particular surfaces to which it is to be secured, the basket carrying a plate which swivels in a 360 degree arc and a sliding extensible bracket with means for holding the same against relative movement when attached.

BACKGROUND OF THE INVENTION

This invention appertains to general utility baskets and more particularly to new and useful improvements in a dispensing type basket having a collapsible and an operable position.

There are many types of utility baskets and dispensing type holders for tissues etc. on the market, but all the prior devices were either confined to wire type tissue dispensing holders or to definite baskets, and further in shipping such baskets they generally require a knock-down position and have been difficult to set up for use.

It is, therefore, a primary object of my present invention to provide a novel utility basket which has a compact collapsible position and which can readily be set up to its open operable position and secured to a desired support.

Another object of my present invention is to provide a general utility basket of the above character with a novel supporting braket designed to hold and support the basket in either vertical or horizontal positions and which bracket can be extended to engage different types of supporting surfaces.

A further object of my present invention is to provide a utility basket which is particularly useful for dispensing tissues and commercial wiping towels and which can very readily be secured inside of an automotive vehicle either to a side wall or under a panel.

Still another object of my present invention is to provide a novel combination dispensing basket and litter basket and to provide a mounting means for the same which swivels relative to the back panel in a 360 degree arc and which carries an adjustable bracket.

A more specific object of the present invention is to provide a basket of the wire type having back, front, bottom and end walls hingedly connected in such a way that the basket may be readily collapsed and folded for shipping and storage and having clip means to hold the basket in its open operable position.

A salient feature of the present invention resides in providing a general utility basket which can be manufactured and produced in different sizes and shapes to adapt the same for various and sundry uses.

A still further object of my present invention is to provide a simple, practical and reliable construction that is economical to manufacture, easy to assemble and positive in its operation.

SUMMARY OF THE INVENTION

Briefly, the present invention is directed to a utility basket for tissues having a substantially rectilinear body formed of parallel back and front walls, parallel end walls, and a bottom wall. The walls are of wire construction and the front wall has a dispensing opening. The top of the basket is left open to receive the tissues to be dispensed.

The end walls are hingedly secured adjacent their vertical edges to the back wall, the bottom wall is hingedly secured to the lower horizontal edges of both the front and back walls. Means are provided for detachably securing the front wall to the leading edges of the end walls so that the basket may be placed in either an operable open position or a collapsed folded position.

The aforesaid walls may be hindely secured by providing a single length of wire looped about a cross wire of one wall and having spaced parallel hook portions secured about a vertical edge of an adjacent wall.

Another feature of the invention resides in a mounting bracket and clamp means rotatably and adjustably secured to the back wall. This means includes a longitudinal plate secured to the back wall with a bracket having a longitudinal slot pivotally mounted thereon. An S-shaped clamping member has one leg slidably received in the bracket slot and a wing bolt threaded through adjacent parallel legs.

BRIEF DESCRIPTION OF THE DRAWINGS

FIGURE 1 is an elevational view in perspective of a wire type basket particularly designed as a tissue dispensing basket, certain parts being broken away for clarity and understanding of its construction;

FIGURE 2 is a diagrammatic or schematic view illustrating how the various walls are associated in folding of the basket toward its collapsed position;

FIGURE 3 is a diagrammatic or schematic view similar to FIGURE 2 but showing the same in its near folded and collapsed position;

FIGURE 4 is a side elevational view in perspective of the basket shown in FIGURE 1 of the drawings, but showing the same in its completely folded and collapsed position;

FIGURE 5 is an enlarged fragmentary end view particularly illustrating how one wall is hingedly connected to another wall;

FIGURE 6 is an enlarged fragmentary view of one of the clips shown in its locked position for holding the basket in its open operable position;

FIGURE 7 is a side elevational view of the bracket and clamping means for securing the basket to a supporting surface, certain parts being broken away and in section to illustrate details in its construction;

FIGURE 8 is a transverse section through the bracket and clamping means, the section being taken on the line 8—8 of FIGURE 7, looking in the direction of the arrows;

FIGURE 9 is an elevational view in perspective similar to FIGURE 1 of the drawings but on a reduced scale and illustrating how the basket may be enlarged and provided with means for disposing of litter and the like or for holding different types of articles;

FIGURE 9A is an elevational view in perspective of a bracket used when the device is to be wall-mounted;

FIGURE 10 is a fragmentary end elevational view showing how the walls may be made of a solid material such as plastic or metal and illustrating a different means for securing the end wall to the front wall; and FIGURE 11 is a fragmentary elevational view illustrating still another means for joining the walls and providing a hinged connection for the walls.

DESCRIPTION OF THE PREFERRED EMBODIMENTS

Referring now to the drawings in detail wherein similar reference characters designate corresponding parts throughout the several views, the letter B generally indicates one type of my improved utility basket, the same shown particularly designed for the dispensing of tissues or commercial wiping towels. The basket B therefore in this form of the invention includes a back wall 20, like end walls 21 and 22, a bottom wall 23 and a front wall 24 being provided with a dispensing opening 25 through which tissue to be dispensed may extend. Since a primary object of this present invention is to provide a basket which can be readily shipped or stored in a collapsed position, the end walls 21 and 22 are hingedly secured to the back wall 20 and the bottom wall is likewise hingedly secured to the bottom edge rod 26 of the back wall 20 and further hingedly carries at its forward end the front wall 24. Thus each of the walls or panels 20, 21, 22, 23 and 24 respectively is of a general rectilinear shape and is of a general standard wire construction to include a length of suitable gauge wire 30 forming the peripheral edge of each panel to which is secured by welding or other methods suitable cross-bars or wires 31 extending horizontally and a number of upright vertical bars or wires 32. The front wall or panel 24 is of course formed with the aforementioned dispensing opening 25.

Attention is now directed more specifically to FIGURE 5 of the drawings, wherein the detail of the hinge means and the fastening or clips means is illustrated. End walls 21 and 22 are hingedly secured to the peripheral vertical portion of each wire 30 of back wall 20 by a single length of wire 33 bent upon itself to form a loop 34 through which one of the cross-bars 31 extends, and the open ends are then bent inwardly in a parallel spaced relation as indicated by the reference numeral 35 to freely receive the cross-bar 31 of the other panel, and extend around the vertical edge 30 of that respective panel. Thus it can be seen that a side panel 21, for example, can pivot in relation to the back wall or panel 20. The hinge members 33 are located adjacent each respective cross-bar for hingedly joining the respective walls. In this manner, both end walls 21 and 22 are hingedly secured to the back wall 20. The bottom wall is likewise identically hingedly secured to the lower portion of back wall 20 and in turn, the forward end has hingedly secured thereto the front wall 24.

From the description so far, and referring to FIGURES 2 and 3 of the drawings, it should be readily apparent that the entire utility basket B can be folded to a compact, collapsed position by folding the end walls inwardly in the direction of the arrows FIGURE 3, allowing the bottom wall to hang loosely and folding the front wall in the direction of the arrow FIGURE 3 overlying the end walls. Thus, as illustrated in the side elevational view, FIGURE 4, the basket can be collapsed to a rather small, compact package. As stated, this permits convenient shipping and storing of the same.

Another important and salient feature of the invention resides in the novel bracket and clamping means 40 as well as the manner of mounting the same to the back wall 20 of the basket B. For this purpose I weld a flat length of plate 41 to said back wall. Obviously, this plate can be secured in any desired manner, such as rolling the edges etc., but preferably is welded to spaced vertically extending upright bars or wires 32, and may be if desired, likewise welded along its horizontal peripheral edge to the adjacent cross-bars or wires 31. This plate then forms a mounting means for securing the pivot bolt 42 to the back wall panel 20.

In order to set up the utility basket in its open operative position in the preferred form of the invention I provide pairs of clips 45 preferably secured to the forward ends 46 of each end wall 21 and 22 respectively, and these clips can be arranged adjacent the top and bottom edges of the respective side panels. Here again it may be found practical to utilize only one clip and the clip could be secured to the front wall rather than to an end wall as shown, and secured adjacent the approximate center of the forward leading edge of each end wall. In any event, each clip is identically formed and therefore it is only necessary to describe the detailed showing of the clip in FIGURE 6 of the drawings. The clip is stamped from a single piece of metal to provide a body portion 46 having end flanges 47 which are rolled or otherwise joined to a respective spaced cross-bar 31 and parallel upper edge 30 of each side panel. A portion of the body 46 is bent back to form a hook or clip portion 48, and this hook portion in turn engages over the vertical edge portions 30 of the front panel 24. Thus, this will hold the front panel in an upright position and will prevent the swinging of the end walls 21 and 22. The clip preferably adjacent its bend is provided with an enlarged rounded portion so that the vertical leading edge of the front panel snaps into the clip portion 48 and is thus secured and the basket held in its open operable position.

The details in the construction of the clamp and bracket means 40 will now be described and for this purpose reference is had to FIGURES 7 and 8, in which the details of the construction of the clamp and bracket means 40 are illustrated. The bracket per se is provided and preferably formed from a single length of metal 50 a portion of which is folded upon itself, as indicated at 51 and 52, to provide a slot therethrough and to slidably receive a leg 53 of the clamping means 54. A portion of the body 50 extends beyond the members 51 and 52 and intermediate its ends is secured the aforementioned pivot pin 42. This pin extends through an aperture formed in the plate 41 secured to the back wall 20 and a jam nut 55 is fitted over the end of the pin and preferably locked in place by means of a cotter pin 56. Also between plate 41 and a portion of the bracket 50 is a spacing washer 57. Thus it can be seen that the entire bracket assembly is mounted to pivot in relation to plate 41 and of course, back wall 20 in a 360 degree arc, and may freely pivot in the direction of the arrows FIGURE 1. The clamp 54 is therefore slidably received within the slot formed in the bracket 50 and thus can be extended within certain limits. The clamp is formed from a single length of spring metal bent to provide the longitudinally extending leg 53, large loop 60 and a parallel extending leg 61 again bent at its opposite end termination to form a similar loop 62 and a relatively short leg portion 63 which is substantially parallel to the lengths 53 and 61. In order to secure the clamp in a fixed position relative to its bracket 50 leg 63 intermediate its ends and leg 61 are provided with aligned threaded openings 65 through which a wing nut 66 extends.

Thus it can be seen that if the basket is to be secured to a support S the end termination of which is at the lowermost point of the support, the wind nut would extend through both aligned apertures and be firmly turned down against the surface of the support S and relative movement of the extended clamp in relation to the bracket would be eliminated. If the support should be in the nature of the type illustrated in dotted lines S', wherein the end termination of the support is in an upright vertical position, the support could be clamped between the smaller leg 63 and leg 61 and then the wing nut 66 would be set directly against this support, and leg 53 would in this instance extend entirely through the slot and the edge 70 would rest adjacent the lower loop 60 at approximately a point 71.

From the description thus far, it is readily apparent that the bracket 50 can be rotated in a 360 degree arc and that the clamp can be extended and adjusted relative to the bracket 50 to accommodate various types of supports. For example, it is also possible to mount the utility basket in either a vertical or horizontal position on the side panel or under the dashboard of an automotive vehicle, and of course, this clamp can be secured to walls and the like when utilized for dispensing commercial wiping towels.

In FIGURE 9 of the drawings, I have illustrated a preferred modification of the basket in which the basket B' is of a substantially same structure as that illustrated in FIGURE 1, except that the back panel 29', end panels 21' and 22', as well as front panel 24' are extended vertically to accommodate a litter container 80 positioned above the tissue dispenser box 81. This litter container can be of any desired construction but for the purposes of illustration the same is of substantially rectangular shape having side walls 82, end walls 83, bottom wall 84 and a partial top wall 85, an opening 86 being left between an end wall 83 and top wall 85 for the reception of litter or other articles that may be placed into the container. Obviously, this container 80 may be made of any desired material, such as cardboard, plastic, sheet metal and the like, but however is of a size and configuration to snugly fit within the open top of the basket and to be positioned adjacent the aforementioned dispensing carton 81. The hinge construction 3 and clips are of identical construction and the basket when collapsed and folded, is folded substantially the same, in that end walls 21'-22' are folded inwardly and front panel 24' is folded upwardly and overlying a portion of the end walls. The bracket and clamp means 40' is also identically formed but may be elongated to accommodate the extra length in the back, end and front panels.

The utility baskets B and B' are as previously mentioned preferably made of wire, but it should be understood that sheet material of either plastic or sheet metal could be utilized and that various other means could be utilized to fasten the front wall to the end walls etc. and various other forms and hinges could be devised. For example, in FIGURE 10 of the drawings, which represents a fragmentary end elevational view of a basket made of sheet material, the front panel 90 could be provided with the male portions 91 of a standard snap fastener closure, and a tab 92 secured at right angles to an end wall 93 could have affixed thereto the female portion 94 of the snap fastener, and thus the panels could be secured together by simply snapping the tab 92 to front wall 90. Further, the hingles could be as illustrated in FIGURE 11 and even the locking of the various panels could be as shown in FIGURE 11. In this form of the invention the sheet material of walls 95 and 96 are provided with mating barrel portions 97 and 98 respectively, of a pintle type hinge structure, and a pin or pintle 99 could be provided having an offset head 100 to manipulate. In this form of the invention the barrels 97 and 98 are fitted together and pin 99 dropped therethrough to hingedly connect the panels or walls 95 and 96 together.

From the foregoing it should be apparent that the novel utility basket can be mounted on a vertical side panel with the open upper end in either a vertical or horizontal position, and further that the bracket could be mounted so that the back wall 20 lies in a horizontal rather than a vertical position and that the front opening can be rotated in a 360 degree arc to any desired position.

It is also readily possible to mount the novel utility basket on a flat wall surface. However, to accomplish this it is necessary to utilize a bracket 101 (FIGURE 9A) and this bracket is merely secured to the wall by screws or the like and then the leg 63 can be readily slipped on the bracket and the device wall-mounted.

In view of the above, it will be evident that many modifications and variations are possible in light of the above teachings. The principal inventive aspects of the invention are described and illustrated in connection with a tissue dispensing and litter basket combination, particularly formed of wire walls or panels.

What I claim as new is:

1. A utility basket of the type having a dispensing opening for tissues and the like comprising: a substantially rectilinear body having parallel back and front walls; parallel end walls joining the back and front walls; and a bottom wall, said walls being of wire construction, the upper portion of said body being open for the reception of the material to be dispensed and said front wall being provided with a dispensing opening, said end walls being hingedly secured adjacent their vertical edges to said back wall, said bottom wall being hingedly secured to the lower horizontal edge of said back wall, and said front wall being hingedly secured to the opposite parallel edge of said bottom wall, said walls being hingedly secured by providing a single length of wire looped about a cross wire of one wall and having spaced parallel hook portions secured about a vertical edge of an adjacent wall; means for detachably securing said front wall to the leading edges of said end walls, whereby said basket has an operable open position with said front wall detachably joined to said end walls and a collapsed folded position wherein said end walls are folded inwardly and said front wall is folded to overlie a portion of said end walls; and a mounting bracket and clamping means rotatively and adjustably secured to the back wall.

2. A utility basket according to claim 1 including a mounting bracket and clamping means comprised of a plate extending longitudinally and secured to said back wall, a bracket pivotally mounted to said plate, said bracket having a longitudinal slot therethrough, a substantially S-shaped clamping member having one leg slidably received within said slot and a wing bolt threadedly received through the adjacent parallel legs to secure said clamp to a support.

References Cited

UNITED STATES PATENTS

| 1,832,715 | 11/1931 | London | 312—6 X |
| 1,910,094 | 5/1933 | Crane et al. | |
| 2,315,595 | 4/1943 | Chappory | 211—148 |
| 2,686,598 | 8/1954 | Brecht | 211—181 X |
| 3,021,106 | 2/1962 | Kramer | 248—311 X |
| 3,031,162 | 4/1962 | Whorton | 248—311 X |
| 3,089,597 | 5/1963 | Kaplan | 211—88 |

ROY D. FRAZIER, Primary Examiner

J. FRANKLIN FOSS, Assistant Examiner

U.S. Cl. X.R.

211—88, 104, 106, 181